(12) United States Patent
Williams

(10) Patent No.: US 10,514,250 B2
(45) Date of Patent: Dec. 24, 2019

(54) INTERFEROMETRY SYSTEM AND ASSOCIATED METHODS

(71) Applicant: University of Utah Research Foundation, Salt Lake City, UT (US)

(72) Inventor: Clayton C. Williams, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 16/313,431

(22) PCT Filed: Jun. 23, 2017

(86) PCT No.: PCT/US2017/039151
§ 371 (c)(1),
(2) Date: Dec. 26, 2018

(87) PCT Pub. No.: WO2017/223542
PCT Pub. Date: Dec. 28, 2017

(65) Prior Publication Data
US 2019/0162526 A1 May 30, 2019

Related U.S. Application Data

(60) Provisional application No. 62/534,080, filed on Jun. 23, 2016.

(51) Int. Cl.
*G01B 9/02* (2006.01)
*G01B 11/14* (2006.01)

(52) U.S. Cl.
CPC .......... *G01B 11/14* (2013.01); *G01B 9/02002* (2013.01); *G01B 9/02019* (2013.01); *G01B 9/02027* (2013.01); *G01B 2290/70* (2013.01)

(58) Field of Classification Search
CPC ............ G01B 9/02002; G01B 9/02003; G01B 9/02015; G01B 9/02019; G01B 9/02027;
(Continued)

(56) References Cited

U.S. PATENT DOCUMENTS 3,643,101 A 2/1972 Shipp et al.
4,600,299 A 7/1986 Abshire
(Continued)

FOREIGN PATENT DOCUMENTS

WO 2008142389 11/2008
WO 2011109895 9/2011

OTHER PUBLICATIONS

Bahrampour et al., "Optical Fiber Interferometers and Their Applications", Interferometry-Research and Applications in Science and Technology, Intech, Mar. 21, 2012, pp. 3-30.
(Continued)

*Primary Examiner* — Jonathan M Hansen
(74) *Attorney, Agent, or Firm* — Workman Nydegger

(57) ABSTRACT

An interferometry system including a coherent light source operable to generate a beam of coherent light is provided. Separate waveguide pathways are optically associated between the coherent light source a photodetector. A transceiving segment can also be optically associated with each waveguide pathway at a location between the coherent light source and the photodetector. Each transceiving segment can be configured to emit an emitted beam of coherent light and positioned to receive a received portion of an emitted beam of coherent light emitted from a transceiving segment optically associated with a different waveguide pathway. The received portion of the emitted beam of coherent light can be combined with coherent light from the waveguide pathway receiving the received portion of the emitted beam of coherent light to form an optical interference signal. According-
(Continued)

ingly, each waveguide pathway can be further configured to direct a separate optical interference signal toward a respective photodetector.

36 Claims, 8 Drawing Sheets

(58) Field of Classification Search
CPC ............ G01B 9/02028; G01B 9/02041; G01B 9/02083
See application file for complete search history.

(56) References Cited

U.S. PATENT DOCUMENTS

| | | | |
|---|---|---|---|
| 4,675,522 A | | 6/1987 | Arunkumar |
| 4,941,744 A | | 7/1990 | Yokokura et al. |
| 5,153,667 A | | 10/1992 | Aoshima et al. |
| 5,200,795 A | | 4/1993 | Kim et al. |
| 5,218,419 A | | 6/1993 | Lipson et al. |
| 5,311,592 A | | 5/1994 | Udd |
| 5,369,489 A | * | 11/1994 | Somekh ............ G01B 11/0608 356/489 |
| 5,392,117 A | | 2/1995 | Belleville et al. |
| 5,541,730 A | * | 7/1996 | Chaney ............ G01B 9/02004 356/482 |
| 5,790,255 A | | 8/1998 | Jackson et al. |
| 6,233,263 B1 | | 5/2001 | Chang-Hasnain et al. |
| 6,687,008 B1 | | 2/2004 | Peale et al. |
| 6,825,935 B2 | | 11/2004 | Nakamura et al. |
| 7,009,710 B2 | | 3/2006 | Sullivan et al. |
| 7,508,523 B2 | | 3/2009 | Chang et al. |
| 7,619,719 B2 | | 11/2009 | Rohner et al. |
| 8,094,292 B2 | | 1/2012 | Park et al. |
| 8,334,982 B2 | | 12/2012 | Fang-Yen et al. |
| 8,379,295 B2 | | 2/2013 | Zheng et al. |
| 8,514,404 B2 | | 8/2013 | Podoleanu |
| 2002/0093648 A1 | | 7/2002 | Nikoonahad et al. |
| 2002/0122186 A1 | | 9/2002 | Igaki et al. |
| 2003/0223672 A1 | | 12/2003 | Joyner et al. |
| 2005/0018202 A1 | | 1/2005 | Wang |
| 2006/0088076 A1 | | 4/2006 | Lubianiker et al. |
| 2010/0092176 A1 | | 4/2010 | Hartog et al. |
| 2010/0157310 A1 | | 6/2010 | Bennett et al. |
| 2012/0105861 A1 | | 5/2012 | Weitzel |
| 2014/0034833 A1 | | 2/2014 | Parks, II et al. |
| 2018/0051980 A1 | * | 2/2018 | Williams ............ G01B 9/02003 |
| 2018/0364431 A1 | * | 12/2018 | Zhao .................... G02B 6/4287 |

OTHER PUBLICATIONS

International Search Report and Written Opinion of PCT/US2015/067226 dated May 12, 2016.
International Search Report and Written Opinion of PCT/US2017/039151 dated Oct. 2, 2017.
Miller, "Reconfigurable Add-Drop Multiplexer for Spatial Modes", Optics Express, Optical Society of Amercia, Aug. 21, 2013, vol. 21, Issue 17, 10 Pages.
Miller, "Self-Configuring Universal Linear Optical Component", Photonics Research, Optical Society of America, 2013, vol. 1, Issue 1, pp. 1-15.
U.S. Appl. No. 15/537,297, filed Oct. 9, 2018, Office Action.

* cited by examiner

INTERFEROMETRY SYSTEM AND ASSOCIATED METHODS

CROSS-REFERENCE TO RELATED APPLICATIONS

This application is a 371 National Stage Entry of International Application No. PCT/US2017/039151, filed on Jun. 23, 2017, which claims the benefit of U.S. Provisional Application No. 62/354,080, filed on Jun. 23, 2016, each of which is incorporated herein by reference

BACKGROUND

Interferometry is a measurement technique that involves the superimposition of electromagnetic waves. One of the many advantages of interferometry includes the ability to achieve measurements with nanometer scale accuracy. Hence, it has been used extensively in metrology, microfabrication, quantum mechanics, and numerous other fields. Interferometry can also be useful for measuring displacement, rotation, refractive index changes, and numerous other variables.

BRIEF DESCRIPTION OF THE DRAWINGS

For a fuller understanding of the nature and advantage of the present invention, reference is being made to the following detailed description of preferred embodiments and in connection with the accompanying drawings, in which.

DESCRIPTION OF EMBODIMENTS

Figure 1:
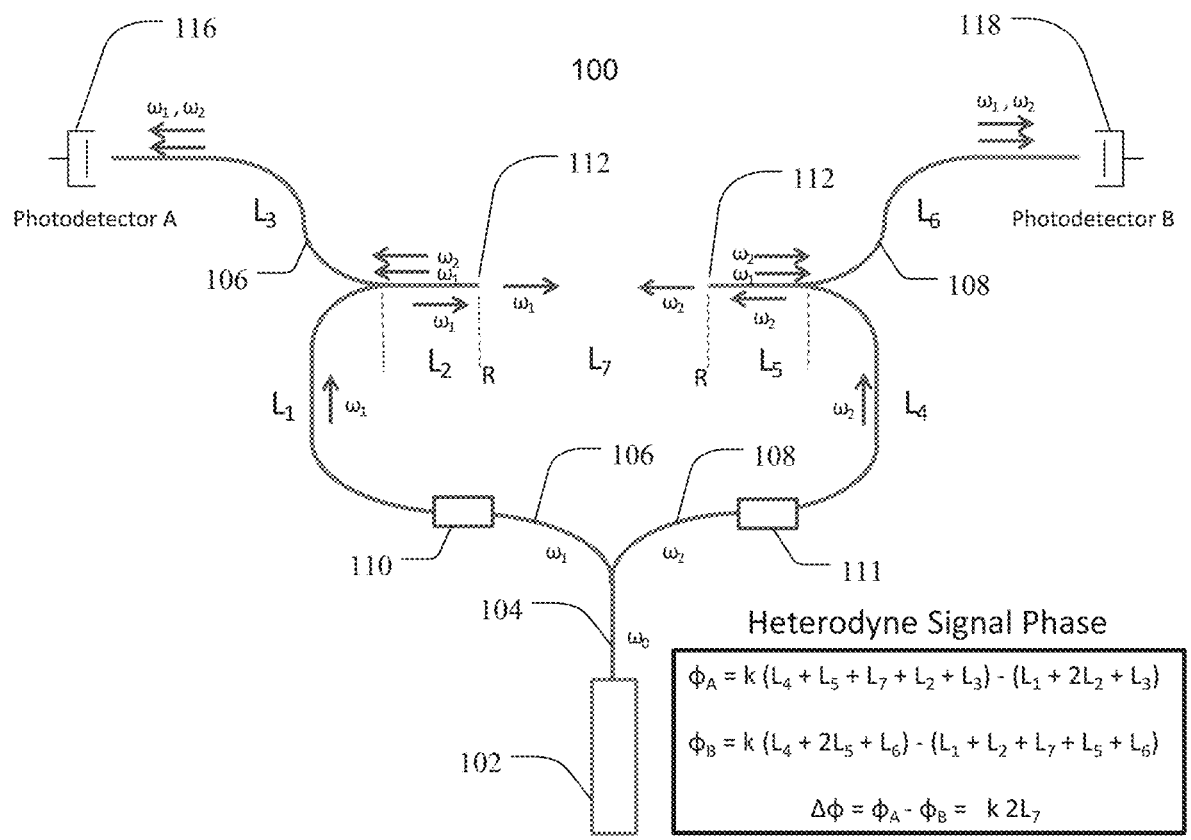
FIG. 1 is a schematic diagram of a system for measuring distance in accordance with an embodiment of the present disclosure.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

As used herein, "associated with" refers to a relationship between one item, property, or event and another item, property, or event. For example, such a relationship can be a relationship of communication. Additionally, such a relationship can be a relationship of coupling, including direct, indirect, electrical, optical, or physical coupling. Furthermore, such a relationship can be a relationship of timing.

Objects or structures described herein as being "adjacent" to each other may be in physical contact with each other, in close proximity to each other, or in the same general region or area as each other, as appropriate for the context in which the phrase is used.

In this application, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly, and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Further, a listing of components, species, or the like in a group is done for the sake of convenience and that such groups should be interpreted not only in their entirety, but also as though each individual member of the group has been articulated separately and individually without the other members of the group unless the context dictates otherwise. This is true of groups contained both in the specification and claims of this application. Additionally, no individual member of a group should be construed as a de facto equivalent of any other member of the same group solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

EXAMPLE EMBODIMENTS

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

The present disclosure relates to novel interferometry devices, systems, and methods for physical measurements in an environment. In one embodiment, for example, the present technology can be utilized to detect distances between two or more points, in one dimension, two dimensions, and/or three dimensions, depending on the specific design and use of a given device, system, or method. Furthermore, such distance measurements can be absolute distance measurements, relative distance measurements, or any other measurement between two or more points, including fixed points and moving points. Moving points would thus include situations where one point is moving relative to another fixed point or to multiple fixed points, as well as situations where two or more points are moving relative to one another. Thus, the present technology can be utilized to measure location, distance, and changes in location and/or distance, to track moving objects, measure velocity, acceleration, deceleration, and the like. Expansion or contraction of an object that causes variation in the distance between measurement points can also be tracked or monitored. Additionally, if the 2D or 3D position of multiple points on a rigid object are known, then the pitch, yaw, and roll of the object can be determined in addition to its 2D or 3D location.

In general, two impinging beams of electromagnetic radiation, that are sufficiently close in frequency, can interfere with one another to generate heterodyne signals in a detector. Heterodyne signals are signals resulting from the interference of two or more electromagnetic signals in a non-linear process, like photo detection, for example. The presently disclosed technology can accurately determine distance between two or more points from one or more heterodyne signals generated by electromagnetic waves transmitted through a waveguide or waveguides. In one embodiment, for example, distance is determined between two (or more) points by splitting a beam of coherent light into separate component beams, and directing each component beam along a separate waveguide pathway before recombining them. The coherent light in at least one of the waveguide pathways is frequency shifted or otherwise modulated to create heterodyne signals at a photodetector at the difference frequency (or 2f). When the light from one waveguide enters a second waveguide that has a light wave of a different frequency propagating in the same direction, the two frequency components will co-propagate. When they reach the detector, the two beams will produce a heterodyne (beat) signal at the difference frequency in the photodetector. Such heterodyne signals can be used to measure distance.

In some examples, separate beams of coherent light can be generated from a plurality of coherent light sources, and each separate beam can be propagated down a separate waveguide pathway. It is additionally contemplated that, in some examples using such separate light sources, one or more of the separate beams of coherent light can be split into separate component beams.

Thus, in some examples, the present interferometry system can include a coherent light source operable to generate a beam of coherent light. The system can further include separate waveguide pathways optically associated with the coherent light source to direct coherent light toward a photodetector optically coupled with each waveguide pathway. A transceiving segment or point can be optically associated with each waveguide pathway at a location between the coherent light source and the photodetector. Each transceiving segment can be configured to emit an emitted beam of coherent light and can be positioned to receive a portion of an emitted beam of coherent light emitted from a transceiving segment of a different waveguide pathway. The portion of the emitted beam received from the different waveguide pathway can form part of an optical interference signal generated from the superposition of beams of coherent light. Specifically, the received portion of the emitted beam from the different waveguide pathway can be superposed with a portion of coherent light from the receiving waveguide pathway, such as a reflected portion or a portion of the component beam that was not emitted, to form the optical interference signal. Thus, each waveguide pathway can be configured to direct a separate optical interference signal toward a respective photodetector.

In one specific example, an interferometry system can include a coherent light source, a first photodetector, and a second photodetector. Additionally, a first waveguide pathway can be optically associated with the coherent light source and operable to emit a first optical beam from a first endpoint (i.e. a first transceiving segment or point). A second waveguide pathway can also be optically associated with the coherent light source and operable to emit a second optical beam from a second endpoint (i.e. a second transceiving segment or point). Further, a third waveguide pathway can be configured to receive an interfering portion of the second optical beam and a reflected portion of the first optical beam such that the reflected portion of the first optical beam and the interfering portion of the second optical beam form a first optical interference signal. The third waveguide pathway can be further configured to guide the first optical interference signal to the first photodetector. Similarly, a fourth waveguide pathway can be configured to receive an interfering portion of the first optical beam and a reflected portion of the second optical beam such that the reflected portion of the second optical beam and the interfering portion of the first optical beam form a second optical interference signal. The fourth waveguide pathway can be further configured to guide the second optical interference signal to the second photodetector.

In this example, the first waveguide pathway and the third waveguide pathway can be combined to define a single waveguide pathway from the coherent light source to the first photodetector. Similarly, the second waveguide pathway and the fourth waveguide pathway can be combined to define a single waveguide pathway from the coherent light source to the second photodetector. The first endpoint and the second endpoint along each respective pathway can also be defined as first and second transceiving points, respectively, positioned along each separate pathway at a position between the coherent light source and the respective photodetector. Any suitable number of such pathways can be employed in the present system, as will be apparent from the descriptions of the system provided herein. It is also noted that the terms endpoint and transceiving segment or transceiving point are used interchangeably throughout this disclosure. Thus, reference to a transceiving segment or transceiving point can also refer to an endpoint, or vice versa.

It will also be apparent from the present disclosure that the interferometry systems described herein can be used in a variety of methods. For example, a method of determining a distance between a plurality of points can include directing a beam of coherent light along separate waveguide pathways toward a photodetector that is optically associated with each separate waveguide pathway. Each waveguide pathway can further include a transceiving segment optically associated therewith. A beam of coherent light can be emitted from the transceiving segment in each of the separate waveguide pathways to form an emitted beam of coherent light. A portion of the emitted beam of coherent light can be received at a transceiving segment optically associated with a different waveguide pathway from which the emitted beam was emitted. The received portion of the emitted beam of coherent light can form part of an optical interference signal generated from the superposition of beams of coherent light. As described above, the received portion of the emitted beam from the different waveguide pathway can be superposed with a portion, such as a reflected portion, of coherent light from the receiving waveguide pathway to form the optical interference signal. Separate optical interference signals can be delivered to respective photodetectors to generate a local interference photocurrent at each respective photodetector. A difference between the local interference photocurrents at each photodetector can be related to a distance between the transceiving segments of the separate waveguide pathways.

In one specific example, a method of determining a distance between a plurality of points can include emitting a first optical beam from a first waveguide pathway at a first endpoint or transceiving point and emitting a second optical beam from a second waveguide pathway at a second endpoint or transceiving point. An interfering portion of the second optical beam and a reflected portion of the first optical beam can be received, combined, or superposed at the first endpoint or transceiving point. The reflected portion of the first optical beam and the interfering portion of the second optical beam can form a first optical interference signal. Similarly, an interfering portion of the first optical beam and a reflected portion of the second optical beam can be received, combined, or superposed at the second endpoint or transceiving point. The reflected portion of the second optical beam and the interfering portion of the first optical beam can form a second optical interference signal. The first optical interference signal can be guided from the first endpoint along the third waveguide to a first photodetector to generate a first interference photocurrent. Likewise, the second optical interference signal can be guided from the second endpoint along the fourth waveguide to a second photodetector to generate a second interference photocurrent. A difference between the first and second interference photocurrents can be related to a distance between the plurality of points.

In this particular example, the first waveguide pathway and the third waveguide pathway can be combined to define a single waveguide pathway directing light to the first photodetector. Similarly, the second waveguide pathway and the fourth waveguide pathway can be combined to define a single waveguide pathway directing light to the second photodetector. The first endpoint and the second endpoint along each respective pathway can also be defined as first and second transceiving points, respectively, that are positioned along each separate pathway and configured to emit a beam of coherent light and positioned to receive an emitted beam of coherent light from a separate waveguide pathway. Any suitable number of such pathways can be employed in the present method, as will be apparent from the descriptions provided herein.

In one specific embodiment shown in FIG. 1, an interferometry device 100 can include a coherent light source 102 that generates coherent electromagnetic radiation at frequency ($\omega_0$) along an initial waveguide pathway 104. The coherent electromagnetic radiation, or coherent light, is split into two waveguide pathways, a first pathway 106 and a second pathway 108. However, it is noted that the light need not be split in all examples. In some cases, multiple coherent light sources can be employed to direct coherent light along separate pathways. In specific examples where the coherent light is split, any suitable splitting configuration can be used, such as a beam splitter, pigtailed waveguides, spliced waveguides, the like, or combinations thereof. As such, in some examples, the interferometer system can include a beam splitter, a waveguide splicer, or the like, to split coherent light into separate component beams. It is further noted that the L1-L7 labels in FIG. 1 represent portions of the first and second pathways. The coherent light in the first pathway has a frequency ($\omega_1$), and the coherent light in the second pathway 108 has a frequency ($\omega_2$), which is frequency shifted or otherwise modulated with respect to the other pathway in terms of any property of coherent light that can be shifted or modulated to facilitate distance measurements. Non-limiting examples can include modulating phase, frequency, amplitude, or any combination thereof. Such techniques of modulation are well known in the art, and any such device is contemplated. The coherent light in one or more pathways can be shifted or modulated, while in other examples the coherent light in one or more pathways is not shifted or modulated. As an example, FIG. 1 shows elements 110 and 111 located along each of the waveguide pathways, which can include shifters or modulators of light. These elements can include any device that is capable of shifting or modulating light in a manner that allows distance measurement according to the present technology, such as frequency shifters, phase modulators, amplitude modulators, and the like, including combinations thereof. Furthermore, the shifter or modulator element in each pathway can be the same or different as in other pathways. In some examples, one pathway may include an element, while another pathway may not.

The first pathway light at frequency on and the second pathway light at frequency $\omega_2$ continue along their respective pathways 106, 108 to waveguide endpoints 112, where light at frequency on and light at frequency $\omega_2$ exit their respective pathways. Light at on enters endpoint 112 of the second pathway 108 and light $\omega_2$ enters endpoint 112 of the first pathway 106. Additionally, a portion of the light in each pathway is not emitted at endpoint 112, but is reflected back from endpoint 112 to continue along its initial pathway. In some cases, such non-emitted light can also be transmitted from L1 to L3 (or from L4 to L6) prior to reaching endpoint 112. As will be recognized by one skilled in the art, the index of refraction of the waveguide can be different from the index of refraction of the air outside the waveguide. As such, when the coherent light traveling along pathways 106, 108 reach their respective endpoints 112, the difference in refractive index between the waveguide and the external air will cause a portion of the light in each pathway to be emitted from endpoints 112, and a portion to be reflected back in the original pathway. Thus, the combination of the non-emitted coherent light with the coherent light received from the other pathway can produce a superposition of two frequency components at $\omega_1$ and $\omega_2$ in each of the pathways propagating toward the corresponding photodetector 116, 118. Part of this light propagates toward the photodetectors through pathways (106, 108). The superposition of the two waves produce heterodyne (beat) signals at each photodetector at the difference frequency ($\omega_1 - \omega_2$), thus generating respective photocurrents. The photocurrents can then be detected and used to calculate the heterodyne signal phase at each photodetector 116, 118, which are in turn used to determine the distance between the endpoints 112 of the two pathways, as is exemplified below.

The coherent light source can include any light generation device or system capable of introducing coherent light into a waveguide, such as, for example, an optical fiber. Non-limiting examples can include fiber lasers, solid state lasers, gas lasers, semiconductor lasers such as laser diodes, photonic crystal lasers, and the like, including appropriate combinations thereof. In one specific aspect, the light source can be a pigtailed laser diode.

Any output power can be employed that is suitable for use with the other components of the system, such as the photodetectors. Depending upon the application, output powers can range from 1 microwatt to more than 1 watt. In many applications, however, a 1-100 milliwatt power can be used. The output power can be chosen based upon a variety of criteria, such as the desired signal to noise ratio, detection bandwidth, saturation of the linear response of the photodetectors, and any light power safety issues related to the use of the interferometer in a particular environment. In some examples, it can be desirable to maximize the output power of the coherent light source without compromising the photodetector or photocurrent generated at the photodetector so as to maximize both the lateral and longitudinal measurement ranges of the divergent beam emitted from the optical fiber.

Further, any suitable wavelength of coherent light can be used in the current system and methods. However, as will be apparent to one skilled in the art, coherent light in the infrared and visible ranges can have a number of practical advantages. Thus, in one aspect, the light source of the current system can emit coherent light having a wavelength of from 400 nm to 1000 nm and higher. In some aspects, the light source can emit coherent light in the infrared range (i.e. having a wavelength from 750 nm to 1000 nm or higher, including both IR and near IR ranges). In some aspects, the light source can emit coherent light in the visible range (i.e. having a wavelength from 400 nm to 750 nm). However, different light sources can have different limitations with respect to the coherency of the light they emit (i.e. over longer distances the ability to interfere can diminish). Thus, some light sources may not be suitable for all applications of the current systems and methods (i.e. measurements over longer distances) if the frequency range for the light source is not sufficiently narrow to generate an adequately coherent beam to produce an interference signal over the required distances. As such, frequency, power, source, and other considerations can be varied to account for the system design and the intended use. The principles described here may also be applied to electromagnetic waves of other frequencies and wavelengths, including microwaves, UV light, and radio waves.

It is noted that coherent light is delivered through the optical fiber; however, a light signal that is emitted from a waveguide endpoint, superposed or added to a second light signal reflected or reintroduced back into a waveguide may not coherently interfere, depending on the size of the waveguide, the size of the waveguide outlet, the distance between the waveguide endpoints, and the like. While there needs to be sufficient coherence in the light to generate interference, the term "coherent" can include both spatial and temporal components. Both of these components are generally needed to generate the interference effects described. Both waveguide endpoints that receive transmitted light from the opposite fiber channel or pathway should also utilize light that is not orthogonally polarized relative to the opposite fiber channel or pathway in order for the interference to occur. In this regard, polarization preserving waveguides or polarizing elements can be useful.

The waveguide can be any material capable of containing and transmitting coherent electromagnetic radiation along its length. Optical fibers, for example, can be generally flexible, and can have minimal mass. A variety of materials can be utilized as optical fiber materials including, without limitation, silica, transparent polymers, and the like, including appropriate combinations thereof. In one embodiment, a polarization preserving fiber can be used to preserve the polarization of a signal within the fiber. Furthermore, in some aspects optical fibers can include single mode fibers. In other aspects, light can be delivered without using optical fibers, and as such, any mechanism for delivering light that allows for interference to occur in the photodetectors is considered to be within the present scope. As one example, in some aspects bulk optical devices can be used to deliver light. However, due to the many practical advantages of single-mode optical fibers, specific reference will be made to this type of waveguide.

A variety of single-mode fibers can be used in the current systems and methods. In some aspects, single-mode fibers can be selected based on their numerical aperture. The numerical aperture of the single-mode optical fiber can control the angle at which the coherent beam of light will emerge from the fiber, thus controlling the lateral and longitudinal ranges of the light emitted from endpoints of an optical fiber. For example, where it is desirable to emit the beam from the fiber end at a large angle (i.e. large lateral range), a fiber with a large numerical aperture can be selected. Conversely, where it is desirable to emit the beam from the fiber end at a narrow angle (i.e. large longitudinal range), a fiber with a small numerical aperture can be selected. Accordingly, the numerical aperture of the single-mode optical fiber can be selected based on a desire for greater lateral or longitudinal coverage of the coherent optical beam. Generally, increasing lateral coverage (i.e. the beam divergence), can compromise the longitudinal range of a detectable signal. Conversely, increasing the longitudinal range (i.e the distance over which an optical signal can be detected) can generally compromise the lateral coverage or breadth over which the optical signal will be detectable. Note that optical elements can be positioned near the waveguide ends which can increase or decrease the effective divergence/acceptance angle of the fiber.

Accordingly, the current system can be used to measure a range of distances depending on the longitudinal and lateral coverage of the system. For example, for one-dimensional measurements on a single axis, the range of the current system can be large (10 meters, or even larger). In this geometry, the coherent beams emitted out of the fibers can be collimated with a lens or made nearly collimated rather than diverging, as will be discussed more fully below. However, when three-dimensional position measurements are desired, the reference and signal beams can be diverging and, therefore, at greater distances the power falling on an optical fiber endpoint of a given pathway from another fiber can become smaller. Under these conditions, the noise can determine the maximum longitudinal and lateral distance that can be measured.

As a non-limiting example for illustrative purposes only, if light of 633 nm wavelength emitted from a fiber endpoint has a Gaussian shape with a beam waist of $2 \times 10^{-6}$ meters, then the divergence half angle will be of order 0.1 radian. This angular width corresponds to an approximate effective light emission and acceptance area of the fiber of order $4 \times 10^{-12}$ meters$^2$. In this example, it is also assumed that the Gaussian beam has a power of 1 mW. The Gaussian beam will spread as it propagates toward another waveguide (with similar effective acceptance/emission area), and then some of the optical power from the Gaussian beam will enter the other waveguide and be combined with light in the other waveguide that is reflected back into the other waveguide by the fiber end (i.e. due to the difference in refractive index between the waveguide and the external environment). The two components will co-propagate down the waveguide until they reach the photodetector, at which point they will produce a heterodyne signal in the photodetector. It is noted that the Gaussian beam light intensity from the emitting waveguide will drop as it spreads out toward the other waveguide. Assuming that a 6.3 nm resolution distance measurement is desired, requiring a photodetector heterodyne signal current signal to noise ratio of 100, the power received by the receiving waveguide (with similar effective photodetector area=$4 \times 10^{-12}$ meter$^2$) can be $4.8 \times 10^{-12}$ watts (based upon calculated shot noise and a detection bandwidth of 1 kHz under conditions consistent with this example, as shown in example 1 below). The maximum area that the signal beam will have after spreading and reaching the other fiber to produce this signal to noise ratio can be approximately $8 \times 10^{-4}$ meters$^2$, as determined by the following relationship: Maximum signal beam area=(signal power/minimum detected power)*(photodetector area)=($1 \times 10^{-3}$ Watt/$4.8 \times 10^{-12}$ Watt)*($4 \times 10^{-12}$ m$^2$)=$8 \times 10^{-4}$ m$^2$. In this example, this maximum beam area corresponds to an approximate beam width of approximately 2.8 cm. Thus, at a divergence angle of 0.1 radian, the beam can spread to a radius of approximately 2.8 cm and still be detected with a signal to noise ratio of 100 by a detector with an effective area of $4 \times 10^{-12}$ meters$^2$. This means that the two fiber ends can be laterally shifted by 2.8 cm without significant reduction in distance measurement resolution (6 nm). At this divergence angle (0.1 radian), the maximum longitudinal range of the measurement is approximately 28 cm. If the power is increased, or the bandwidth decreased or the divergence angle decreased, the longitudinal range can also be increased. Where the divergence angle is 0.01 radian, corresponding to a Gaussian beam waist of approximately $2 \times 10^{-5}$ meters (effective detector area=$4 \times 10^{-10}$, then the longitudinal range will increase to approximately 28 meters (assuming a 1 mW power, signal to noise ratio of 100), with a lateral range of approximately 28 cm.

With proper optics, the divergence angle of the fibers can be made larger or smaller. This can provide a significant amount of flexibility for performing 1D, 2D, and 3D distance measurements. For 1D measurements, precise alignment of two fiber endpoints is not necessary, because measurements can be performed even if the endpoints are not laterally aligned to better than 2.8 cm (with respect to the first non-limiting example).

Continuing the non-limiting example, where several reference fiber endpoints are placed in a reference plane, which in some examples is at a fixed position, and at a separation of less than 2.8 cm between them, where each reference fiber endpoint is configured to separately measure the distance between that reference fiber endpoint and a signal fiber endpoint, then measurement of the three dimensional position of the signal fiber endpoint can be detected over a large lateral range (much larger than the individual lateral range of each endpoint pair (2.8 cm), using triangulation methods. In some further examples, a plurality of signal fiber endpoints can also be used with the plurality of reference fiber endpoints. In some examples, the number of reference fiber endpoints can exceed the number of signal fiber endpoints.

Suitable ranges can be ranges at which a fiber/photodetector (as shown in FIG. 1) can detect an interfering optical signal from an associated fiber/photodetector. As shown above, the minimum detectible power of the interfering beams can be determined by the noise which dominates in the detection process and the bandwidth of the detection system. As is shown below, a heterodyne interference signal detected by a photodetector is proportional to the square root of the product of the power of the two interfering waves. The light wave which is reflected from the endpoint of the waveguide is typically very strong compared to the beam which is transmitted from one waveguide and enters the other. Under these conditions, the heterodyne power can be much larger than the power of the transmitted wave by itself, making it possible to detect very small amounts of light transmitted between the two fibers.

As previously discussed, an optical fiber can be a single optical fiber or split into separate fiber channels, thus splitting the beam of coherent light into separate component beams and directing each component beam along a separate waveguide pathway. A single or multiple fiber channels can include a frequency shifter, phase modulator, optical modulator, or the like. Nonlimiting examples of phase modulators or optical modulators can include an acousto-optic modulator, an electro-optic modulator, a magneto-optic modulator, a mechano-optic modulator, a phase modulator, or other suitable device. In one example, a frequency shifter can be used. In another example, a phase-modulator can be used. In yet another example, an acousto-optic modulator can be used. As such, coherent light is delivered into at least two pathway channels, and is frequency shifted or modulated via frequency or phase modulation devices in at least one channel such that the light in each separate channel has a different frequency ($f_1$, $f_2$, $f_3$ . . . ). It is noted that various types of modulation can be utilized, including without limitation, frequency modulation, phase modulation, amplitude modulation, frequency shifting, phase shifting, and the like, including combinations thereof. By using a different modulating frequency in each channel, interference between any pair of channels can be independently detected by measuring the heterodyne signal at the difference frequency of the two channels.

Any type or design of photodetector can be used, such as, for example, a photodiode having a p-n junction or a p-i-n junction. As will be appreciated by one skilled in the art, many suitable variations or alternatives can be employed to select and/or prepare a suitable photodetector.

The photodetector is positioned so as to receive the two co-propagating waves in the waveguide at $\omega_1$ and $\omega_2$ (heterodyne signal) from the associated channel, which can be accomplished using a number of configurations. For example, in one embodiment the photodetector can be pigtailed directly to the waveguide channel. In another case, the light waves emitted from the waveguide channel can be focused on the photodetector using a lens or other similar optical device.

A variety of lenses can be used at any useful location along any of the waveguide channels, such as at the waveguide endpoints (FIG. 1, 112) or at the waveguide channel/photodetector interface, for example. Depending on a particular application, such a lens can function to change the angle of divergence, to collimate and/or refocus the light signal at a specific location, or the like. As non-limiting examples, graded index lenses or regular lenses can be used. Thus, similar to the numerical aperture of the optical fiber, the lens can also be used to control the beam divergence and the associated longitudinal or lateral coverage of the beam.

As previously noted, at least one waveguide channel can be directionally oriented toward another waveguide channel such that light emitted from the waveguide endpoints will impinge upon an opposite-facing waveguide channel endpoint. Heterodyne signals generated thereby are picked up by the waveguide endpoints, and therefore a given photodetector receives at least a component of light from both waveguide channels. Once at the photodetector, each heterodyne signal generates charge carriers in the associated photodetector related to the optical field variations in that signal. The electrical signal that is output from a given photodetector is an electronic representation of the heterodyne signal, which can be used to determine the distance between the waveguide endpoints (e.g. FIG. 1, 112). One parameter that can be useful is the phase of the heterodyne signal, which can be detected using a lock-in amplifier or other suitable device. It can be shown that by measuring the phase of the heterodyne signal at each photodetector, and comparing these phases (taking their difference), the optical path length (phase delay) experienced by the light while in each of the waveguide pathways can be eliminated. Simultaneously, the difference phase between the heterodyne signals from the two detectors can be directly related to the distance between the waveguide endpoints or changes in the distance between the waveguide endpoints.

Figure 2A:
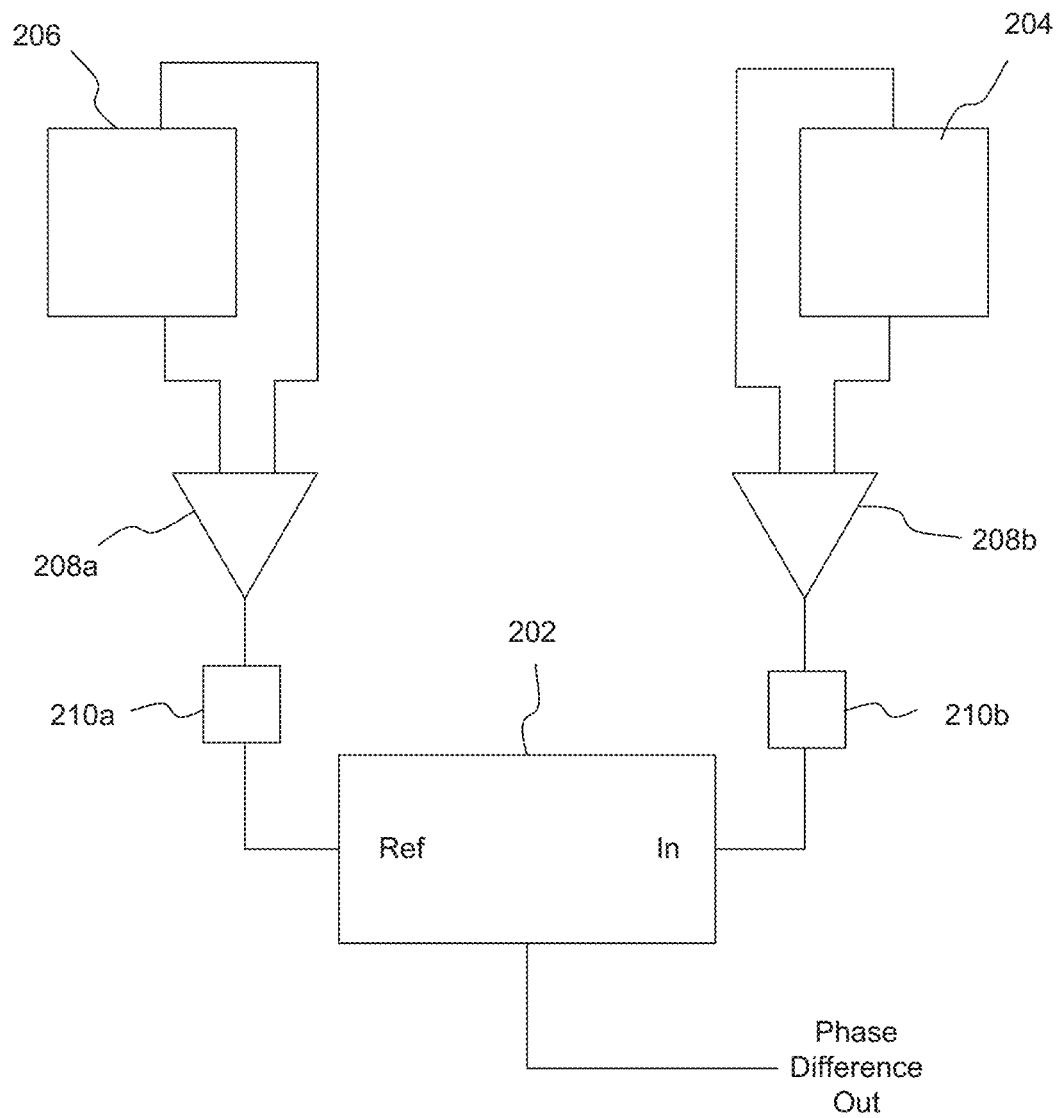
FIG. 2A is a schematic diagram of a system for measuring distance in accordance with an embodiment of the present disclosure.
Figure 2B:
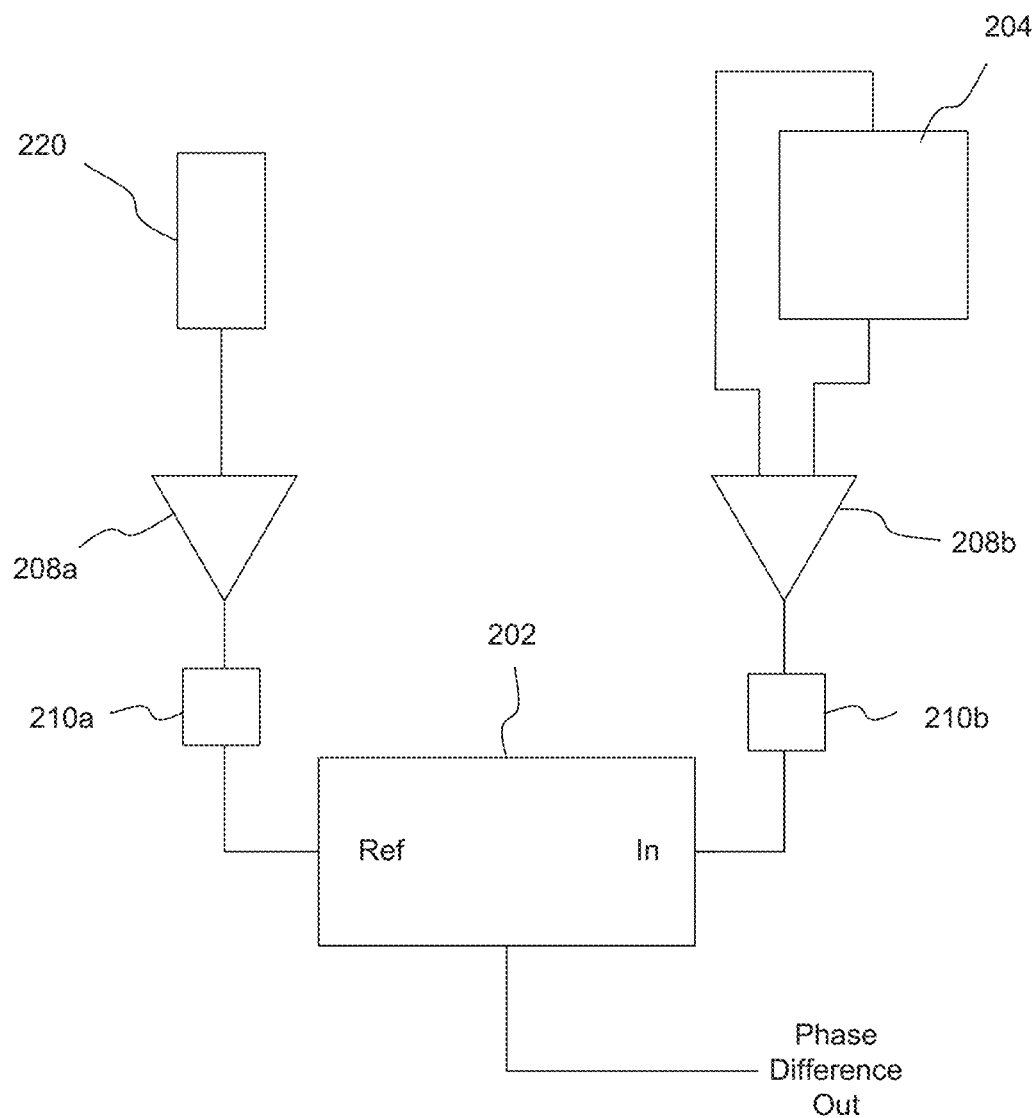
FIG. 2B is a schematic diagram of a system for measuring distance in accordance with an embodiment of the present disclosure.

Various techniques can be utilized to detect phase, and while lock-in amplifiers are specifically described, such should not be seen as limiting as the present scope includes other known phase detection techniques. As illustrated in FIG. 2A, one example of a lock-in amplifier 202 can be used to detect the photocurrents from each photodetector 204, 206. Respective photocurrents generated at photodetectors 204 and 206 can be amplified via amplifiers 208a,b. Optional filters 210a,b can be used to filter the signals before going into the lock-in amplifier 202. However, in many cases a lock-in amplifier can provide adequate signal filtering without the addition of supplemental filters. In this case, the heterodyne signal from one detector is used as the reference signal to the two channel lock-in amplifier which detects the signal from the other detector. Thus, a lock-in amplifier can be used to reliably detect and extract the phase difference between the heterodyne signal coming from each of the two photodetectors. Alternatively, as illustrated in FIG. 2B, a frequency signal from an optical modulator 220 can be sent as a reference signal to the lock-in amplifier 202, detecting the phase of the heterodyne signal from a detector with respect to the electrical signal used to produce the optical modulation in that waveguide. FIG. 2B illustrates a signal coming from a single optical modulator and waveguide.

As is described in more detail below, the interference photocurrent from each of the photodetectors can be used to determine the distance or change in distance between the waveguide endpoints. It is noteworthy that the two heterodyne signals from the two photodetectors are at the same frequency (difference between the two modulation frequencies of the two channels or fiber arms). These can be detected by a single lock-in amplifier, if one signal is input as the reference to the lock-in amplifier and the other as the signal to the lock-in amplifier. It is also possible to use two separate lock-in amplifiers, each detecting the heterodyne signal from each photodetector separately, using a lock-in amplifier reference produced directly from the modulators (electrical signal) at the difference frequency of the two modulators, and the lock-in signal coming directly from a single photodetector. In this scenario, the phase of each signal can be measured separately, and then the difference between the two signals can be determined by subtracting the two phase signals from the two lock-in amplifiers.

Figure 3:
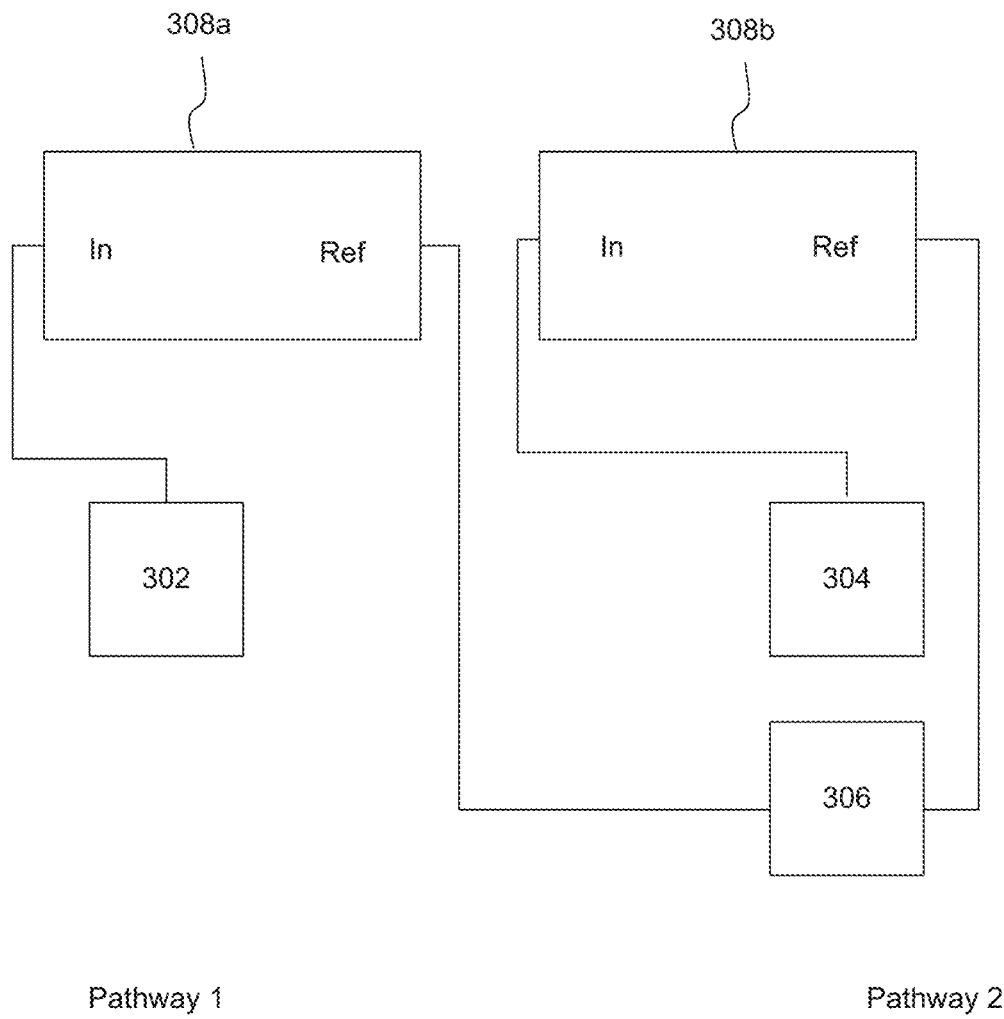
FIG. 3 is a schematic diagram of a system for measuring distance in accordance with an embodiment of the present disclosure.

For example, FIG. 3 shows one embodiment of an electronic configuration for phase detection where a modulator is used on one pathway. In this case, pathway 1 (not shown) delivers light to a first photodetector 302, and pathway 2 (not shown) delivers light to a second photodetector 304 via an optical modulator 306. As illustrated, separate lock-in amplifiers 308*a,b* can each detect the heterodyne signal at each photodetector 302,304 separately, using a lock-in amplifier reference produced directly from the modulator 306 (electrical signal).

Figure 4:
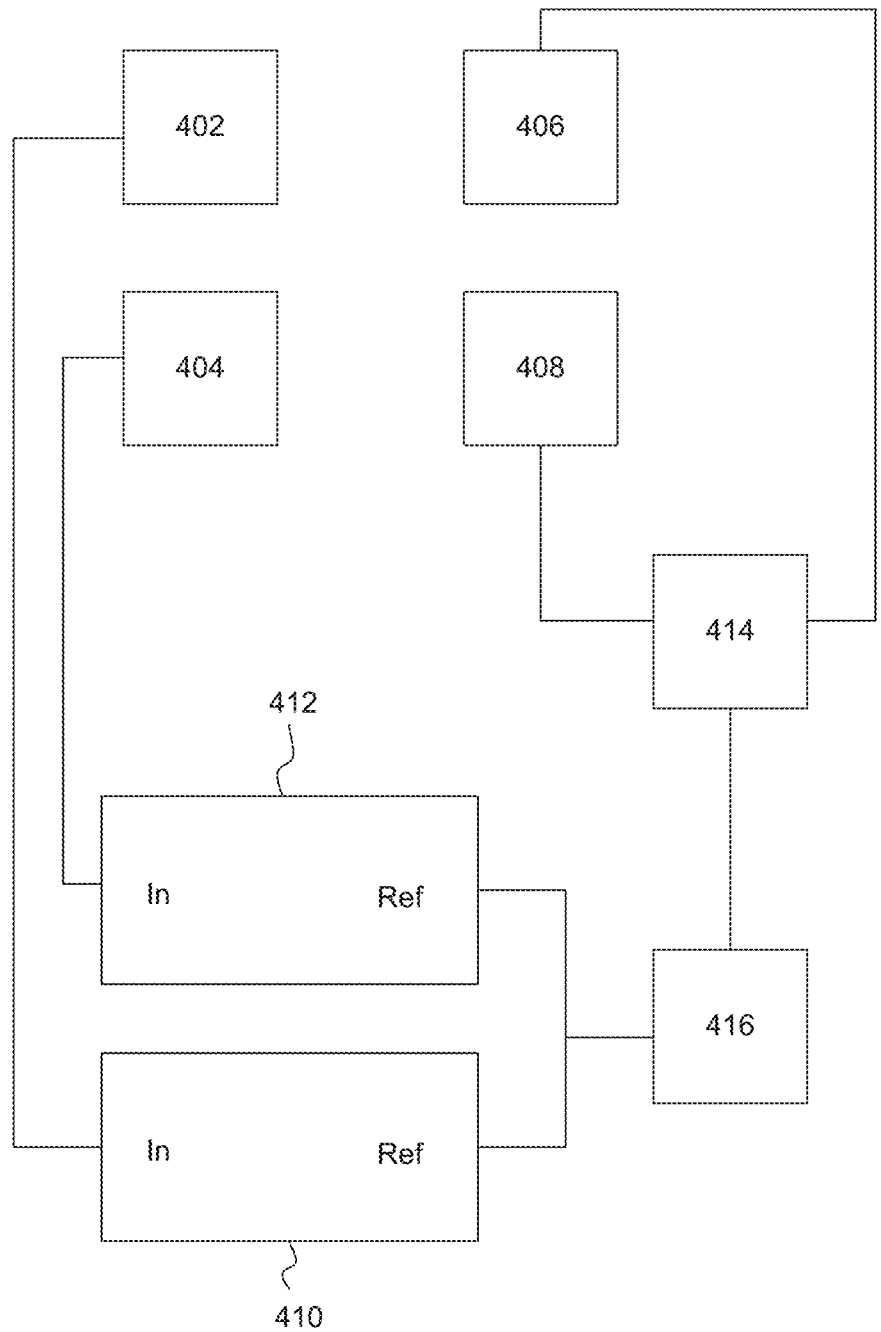
FIG. 4 is a schematic diagram of a system for measuring distance in accordance with an embodiment of the present disclosure.

FIG. 4 illustrates another electronic embodiment for phase detection, where the light pathway has been removed for clarity. Light is delivered to photodetectors 402, 404 through optical modulators 406, 408. Electronic signals generated in the photodetectors 402, 404 from the heterodyne signals is delivered to the signal inputs of lock-in amplifiers 410, 412. The electronic difference frequency of the optical modulators 406, 408 can be used as a reference signal for the lock-in amplifiers 410, 412. In one example, the optical modulator 406, 408 frequencies can be sent to a mixer 414 to obtain $f_1+f_2$ and $f_1-f_2$ reference signals. A filter 416 filters the reference signal $f_1+f_2$ and passes the $f_1-f_2$ reference signal to the reference input of the lock-in amplifiers 410, 412. In this scenario, the phase of each heterodyne signal can be measured separately, and then the difference between the two signals can be determined by subtracting the two phase signals from the two lock-in amplifiers.

In some example embodiments, waveguide endpoints can be oriented in a common direction, resulting in a novel device for measuring distances in a variety of applications. In such a geometry, coherent light emitted from a first waveguide endpoint travels to a surface, and is reflected back, either by the surface itself or a reflector on the surface (e.g. a retro-reflector element in one example). The light from the first waveguide then enters the second waveguide and produces a beat signal at the photodetector of the second waveguide. The same is true for the light emitted from the second waveguide. It travels to the surface and is reflected back from the surface or a reflector (or retro-reflector). This reflected light then travels and enters the first waveguide where it produces a beat signal detected by the photodetector of the first waveguide. Since the beat signals in both detectors are at the same frequency, a phase difference between the two beat (heterodyne) signals can be measured, in the same way as when the two fibers are pointing toward each other. This system measures the round trip distance involving a reflection from a surface between the two fibers.

Figure 5A:
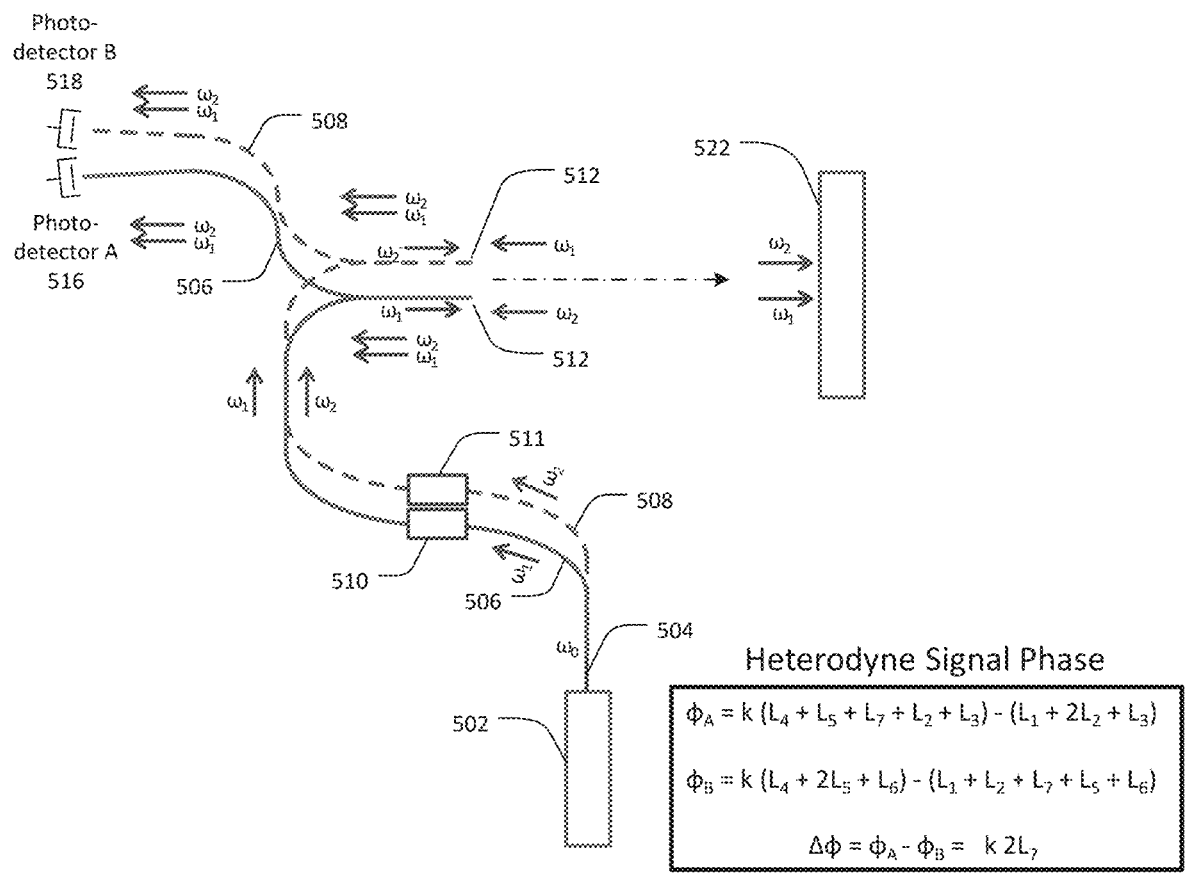
FIG. 5A is a schematic diagram of a system for measuring distance in accordance with an embodiment of the present disclosure.

As is shown in FIG. 5A, for example, an interferometry device 500 can include a coherent light source 502 that generates coherent light along an initial waveguide pathway 504 ($\omega_0$). The coherent light is split into two waveguide pathways, a first pathway 506 ($\omega_1$) and a second pathway 508 ($\omega_2$). The coherent light in one of the pathways is shifted or otherwise modulated with respect to the other pathway in terms of any property of coherent light that can be modulated to facilitate distance measurements. Non-limiting examples can include modulating phase, frequency, amplitude, or any combination thereof. Such techniques of modulation are well known in the art, and any such device is contemplated. In some examples, the coherent light in both pathways (or in every pathway, in cases of more than two pathways) can be shifted or otherwise modulated. As an example, FIG. 5A shows a light modulator 510, 511 located along each of the waveguide pathways. The light modulators 510, 511 can be any device that is capable of modulating light in a manner that allows distance measurement according to the present technology, such as frequency shifters, phase shifters, amplitude modulators, and the like, including combinations thereof. Furthermore, the light modulator in each pathway can be the same or different from the light modulator in other pathways. In some examples, one pathway may include a light modulator, while another pathway may not.

Whether modulated or not, the first pathway light $\omega_1$ and the second pathway light $\omega_2$ continue along their respective pathways 506, 508 to waveguide endpoints 512, where light $\omega_1$ and light $\omega_2$ exit their respective pathways. It is noted that, while the first and second waveguide pathways can be the same or different lengths and can follow the same or different paths, the waveguide endpoints 512 are positioned adjacent to one another, pointing in the same direction or a direction such that the light from one fiber, after reflection can enter the other waveguide. Light $\omega_1$ and light $\omega_2$ are emitted from the waveguide endpoints 512 and reflect off of a surface 522 to be measured. A portion of reflected light $\omega_1$ enters the waveguide endpoint 512 of the second pathway 508, and forms a heterodyne signal on the detector 518 of waveguide 2. Similarly, a portion of the reflected light $\omega_2$ enters the waveguide endpoint 512 of the first pathway 506, and forms a heterodyne signal at the photodetector 516 of waveguide 1, generating the respective photocurrents. The photocurrents can then be used to calculate the heterodyne signal phase at each photodetector 516, 518, which are in turn used to determine the distance from the waveguide endpoints 512 to the surface 522.

Figure 5B:
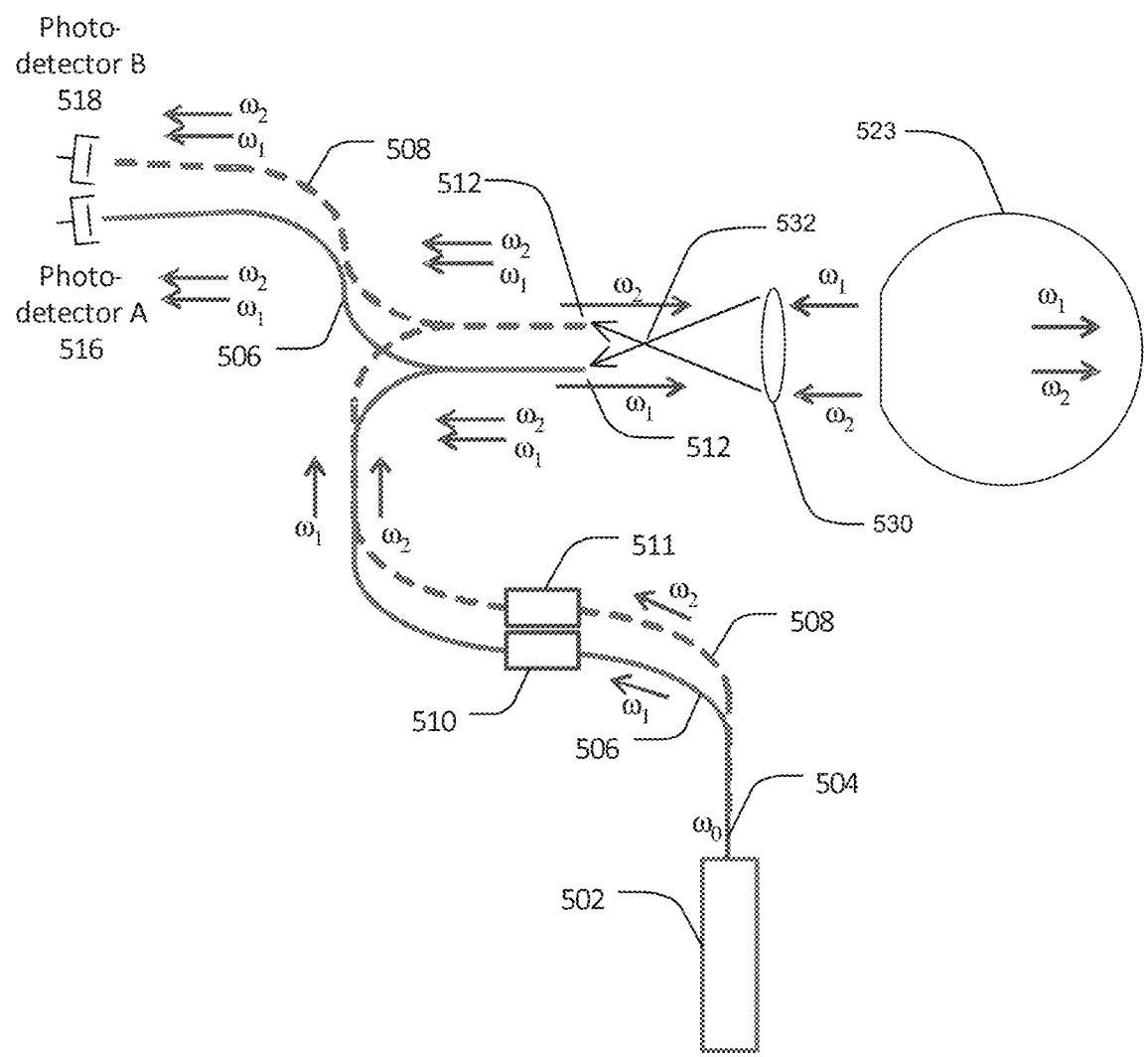
FIG. 5B is a schematic diagram of a system for measuring distance in accordance with an embodiment of the present disclosure.

FIG. 5B illustrates a variation of FIG. 5A. Specifically, in the example depicted in FIG. 5B, the reflective surface 522 has been replaced with a retroreflector 523 (e.g. a spherical retroreflector or "cat's eye," for example). Further, a lens 530 has been positioned proximate the endpoints 512, which are positioned close together (such as within 25 micrometers, for example). The lens 530 can be positioned such that the focal point 532 of the lens 530 can be further from or nearer to the lens 530 than the endpoints 512, which can allow light from pathway 506 to illuminate endpoint 512 of pathway 508, and vice versa. This can help maximize the amount of coherent light impinging on each of the fiber ends.

Figure 6A:
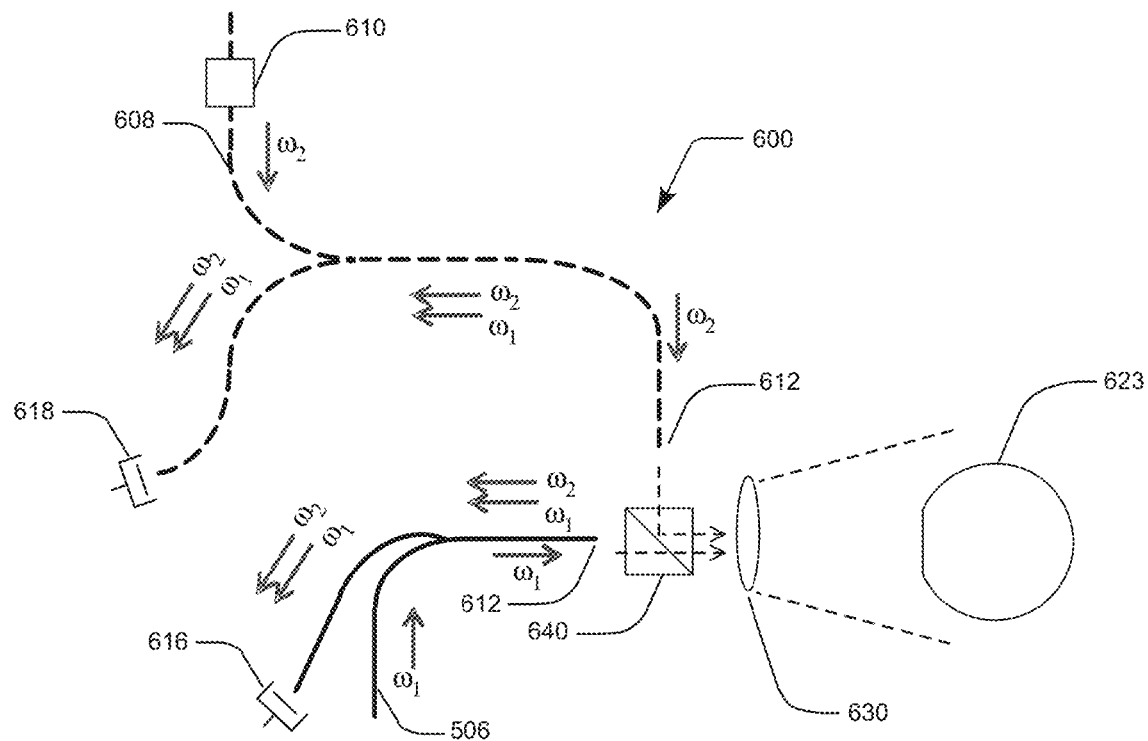
FIG. 6A is a schematic diagram of a system for measuring distance in accordance with an embodiment of the present disclosure.
Figure 6B:
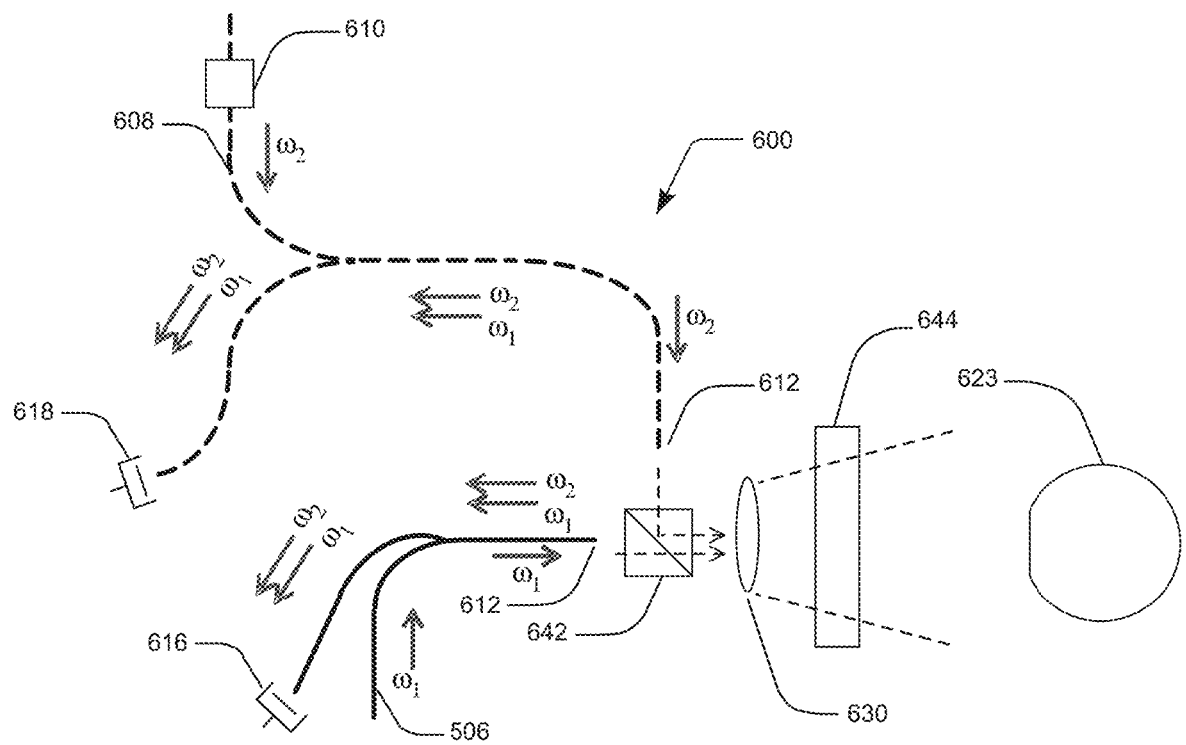
FIG. 6B is a schematic diagram of a system for measuring distance in accordance with an embodiment of the present disclosure.

FIGS. 6A and 6B illustrate some examples of the present system where the fiber ends are not facing one another or facing in a common direction. In some examples, the fiber ends can be positioned orthogonal to one another. As is shown in FIG. 6A, for example, an interferometry device 600 can direct coherent light along a first pathway 606 ($\omega_1$) toward photodetector 616 and along a second pathway 608 ($\omega_2$) toward photodetector 618. The coherent light in one of the pathways can be shifted or otherwise modulated via modulator 610. Any suitable modulator can be used, such as described above with respect to FIG. 5A. Prior to reaching photodetectors 616, 618, the first pathway light $\omega_1$ and the second pathway light $\omega_2$ continue along their respective pathways 606, 608 to waveguide endpoints 612, where light $\omega_1$ and light $\omega_2$ exit their respective pathways.

The first pathway light $\omega_1$ and the second pathway light $\omega_2$ can then be split by a beam splitter 640. In some specific examples, the first pathway 606 and the second pathway 608 can be optically associated with the beam splitter 640 at their respective endpoints 612. Whether coupled or not, split potions of the first pathway light $\omega_1$ and the second pathway light $\omega_2$ can be directed toward a reflective surface, such as retroreflector 623. Optionally, the split potions of the first pathway light $\omega_1$ and the second pathway light $\omega_2$ can be focused toward retroreflector 623 using a lens 630. In some examples, the beam splitter 640 can be configured to direct the first pathway light $\omega_1$ and the second pathway light $\omega_2$ toward the retroreflector 623 without the use of a lens 630. Light $\omega_1$ and light $\omega_2$ are reflected off of the retroreflector 623 and directed back to the beam splitter 640. In some examples, a lens 630 can be positioned to focus the reflected light $\omega_1$ and reflected light $\omega_2$ toward the beam splitter 640. A portion of the reflected light $\omega_1$ is directed by the beam splitter 640 to enter the waveguide endpoint 612 of the second pathway 608, which forms a heterodyne signal on the detector 618 of waveguide 2, generating the respective interference photocurrent. Similarly, a portion of the reflected light $\omega_2$ is directed by the beam splitter 640 to enter the waveguide endpoint 612 of the first pathway 606, which forms a heterodyne signal at the photodetector 616 of waveguide 1, generating the respective interference photocurrent. The photocurrents can then be used to calculate the heterodyne signal phase at each photodetector 616, 618, which are in turn used to determine the distance from the waveguide endpoints 612 to the retroreflector 623.

FIG. 6B illustrates a variation of the system depicted in FIG. 6A. Specifically, in the example illustrated in FIG. 6B, the beam splitter 642 can be a polarizing beam splitter. A quarter wave plate 644 can be used in connection with the polarizing beam splitter 642. In this specific example, the polarizing beam splitter 642 can be configured to direct polarized light $\omega_1$ and polarized light $\omega_2$ through the quarter wave plate 644 and onto the retroreflector 623. The polarized light $\omega_1$ can be reflected from the retroreflector 623 back through the quarter wave plate 644 and polarizing beam splitter 642 to maximize the amount of light $\omega_1$ that enters fiber endpoint 612 of the second pathway 608, which forms a heterodyne signal on the detector 618 of waveguide 2. Similarly, the polarized light $\omega_2$ can be reflected from the retroreflector 623 back through the quarter wave plate 644 and polarizing beam splitter 642 to maximize the amount of light $\omega_2$ that enters fiber endpoint 612 of the first pathway 606, which forms a heterodyne signal on the detector 616 of waveguide 1. The photocurrents can then be used to calculate the heterodyne signal phase at each photodetector 616, 618, which are in turn used to determine the distance from the waveguide endpoints 612 to the retroreflector 623.

Numerous applications for such a system of measurement are contemplated, a few non-limiting examples of which are described. The sensitivity of a well-compensated interferometer can be used to detect very small height or index of refraction changes on a surface. Such a system can scan across a surface, taking multiple distance measurements to characterize various surface features, roughness, refraction changes, and the like. Non-limiting examples can include finger print scanners, thin film detectors, defect detectors, molecular film location detection (DNA gel electrophoresis readout), and the like. Such a system can also be used to read out a topographic bar code, which would be based on surface height or phase delay of a surface structure. In another example, the system can be used as a credit card reader, in which the information is encoded by topography or optical phase. A system using reflection mode can be used for surface profiling, as in a scanning microscope, or a non-contact inspection system, even on rough surfaces. In another example, such a system can be used to detect the motion (defection) of an Atomic Force Microscope cantilever. When a known physical distance change is available, it can be used to measure the index of refraction of a medium. Waves or disturbances passing through a known separation between the fiber ends can be used to detect and determine the strength of the wave passing through. Examples would be to measure sound in air or water (hydrophone), or temperature, chemical composition, pressure of gas or liquid through which the optical beam pass. One example may include measurement of surface acoustic waves, for example, in a surface acoustic wave filter.

In another embodiment, the system can be utilized to detect only light from a dynamic spatially localized phase shifter oscillating at a fixed frequency. In this implementation, the system described above can be used to send light from one fiber (at frequency w1) into the other fiber by reflecting from a surface. Light from the other fiber (at frequency w2) is sent to the surface and enters the first fiber in a similar way. However, in this case, a reflecting element is placed on the surface, and its vertical position is modulated by an actuator (at frequency w3), such as a piezoelectric film or device. This modulation of its height will produce a phase modulation on the reflected beams. Typical phase modulation amplitudes would be 90 degrees or Pi/2.

If the modulation occurs at a fixed frequency (w3), a beat signal can be obtained at frequency w1−w2+w3 or w1−w2−w3 at both detectors. The phase of these beat signals can be measured and compared to determine movement and or location of the localized reflecting phase shifter element at the surface. The advantage of this system is that only light that is phase modulated at frequency w3 is detected. Therefore, any light scattered back into the fibers by the surrounding surface will not contribute to the detector signal at frequency w1−w2+w3 (or other fixed frequencies). In another example, such measurements can be performed using light at the same frequency from each fiber (w0). In that case, the phase modulation at frequency w3 would produce a beat signal in each fiber at frequency w3 and its harmonics. This would eliminate the need for frequency shifters in the waveguide pathways.

In some example embodiments, distance can be determined using multiple waveguides, including the waveguide endpoints, one or more surfaces or layers of the photodetectors, or other photodetector structures, and the like, and as such, the locations of where distance measurements are taken from should not be seen as limiting the present scope. In one specific aspect, the distance is the distance between the cores of the fiber waveguides. In other cases, distance can be a measure of changes in distance or location, and thus a distance from a reference point to a given position can be determined without knowing the exact location of the waveguide endpoints.

Additionally, 2D or 3D measurements can be made using the principle of triangulation. For example, a 1D system can be constructed to measure changes in distance using a single pair of waveguides and detectors. In this system, the divergence of the light can make it possible to move one of the two waveguides laterally with respect to the other over a finite lateral range without losing the interference signal. The distance measured by this system will be the changes in absolute distance between the two waveguide endpoints even when the two endpoints are not aligned on a single axis. The distance measured will be the total 3 dimensional distance between the two endpoints.

From this system, a 2D or 3D system can be constructed. This can be done by having one signal or positioning waveguide endpoint whose 3D position is of interest to be known, and then a series of other reference waveguide endpoints that are fixed in a reference grid. These reference detectors can be arranged such that each acts with the signal waveguide endpoint to uniquely measure the change in absolute 3D distance between the reference waveguide endpoints and the signal waveguide endpoint at any given time. This can be achieved by causing each reference waveguide endpoint to have a unique frequency shift in that pathway that is different from all other reference endpoints, thus enabling the interference signal from each adjacent pair of reference endpoints to be independently detected. If the reference endpoints are all laterally separated in space and fixed, by measuring the changes in 3D distance between the signal waveguide endpoint and all, or a plurality, of the reference waveguide endpoints, triangulation formulas can be used to uniquely determine the 3D position of the signal waveguide relative to the known reference waveguides. Thus, to have 3D knowledge of the signal waveguide endpoint, at least three reference endpoints can be used. The light from a single laser source can be modulated (frequency shift, phase shift, amplitude) in each reference arm at a different frequency to provide a unique signal to that arm. Initial calibration procedures of the 3D position of the waveguide endpoints may be needed to establish the equations to extract the 2D or 3D position of the signal endpoint. Once calibrated, these relationships will enable the 2D or 3D position to be determined at a rapid rate.

In other example embodiments, systems can be utilized to provide 3D position measurements that can include rotation, linear (3D), pitch, yaw, rotation, and straightness, as well as coordinate measurement machine (CMM) functionality. 3D position measurements of a signal fiber end can be made over a 3D volume under various conditions using at least 3 reference fibers and at least 1 signal fiber. If the measureable volume is larger than what can be accessed by the 3 reference detectors due to their finite acceptance angle, then one can use a rotational device to reorient the reference and signal detectors so that they now fall within the divergence/acceptance angle to perform distance measurement. However, since rotation of the reference or signal fibers may change the 3D location of their end points, a method for determining the new position of the fiber ends relative to their positions before rotation is needed. By having 3 signal fibers (with frequencies w1,w2,w3) and 3 reference fibers (with frequencies w4,w5,w6), all able to exchange light between each another, the changes in position of each fiber can be determined, even during rotation. If all positions are known initially, then the changes can be constantly monitored to determine the location at any given time. If the reference fibers (rigidly affixed to a plate, with pre-calibrated 3D locations) are rotated from their initial positions, then by monitoring the distance between each fiber end and the 3 signal fiber ends (whose position is known by previous measurements), then the new 3D positions of the reference detectors can be determined, using standard triangulation methods. Once the rotation of the reference detectors has occurred and the new location of the 3 reference fiber ends is known, then the 3 signal fibers can be rotated, while monitoring the distance between all of the 3 signal fibers and the 3 reference fibers. With knowledge of the position of the signal fiber ends before rotation, and the measured displacement changes of each fiber measured during the rotation, the new 3D location of each of the signal fibers can be determined after rotation. At this point, the position of all of the 3 signal fibers relative to the 3 reference fibers is known, so additional relative movement between the signal and reference fibers can be accurately measured over the additional measurement volume provided by the rotational movements. When the position of the 3 signal fibers again starts to fall outside of the angular range of the signal fibers (and vice versa), the process can be repeated. By this method, a 3D measurement of the signal fibers can be determined over a large 3D volume, even when it is required to rotate both the signal and reference fibers to assure that they fall within the divergence/acceptance angles of the fibers.

In some geometries, it is advantageous to have a large fiber divergence angle, so that the light diverges quickly and so that light detected can arrive from large angles and still be collected by the fiber. The acceptance angle of a single mode fiber is determined by the numerical aperture of the fiber, which is set by the size of the fiber mode and index of refraction difference between the core and the cladding. By adding various types of optical elements, the numerical aperture can be increased or decreased. Such elements include an aperture, divergent or convergent lens, diffraction grating, phase grating, evanescently coupled film, diffusing film or a reflector.

Single mode fiber connectors can be polished either to create a reflection at the interface or to avoid reflection. This principle can be used to optimize the 3D fiber interferometer. Fiber ends can be coated to increase or decrease reflection at the interface.

Triangulation methods are well known for determining 3D location. These methods will be used to determine the location of signal and reference fibers. When multiple measurements are performed, additional determination of the pitch, yaw, roll and straightness of a rigid object is possible, among other degrees of freedom.

When using a fiber interferometer system in which the light is emitted in the same direction from each fiber, it may be necessary to provide a means for the light returning from the reflective surface to enter into the other fiber from which it was not emitted. There are many methods know in the art to redirect light beams including beam splitters, diffusers, apertures, gratings, defocussed lenses, etc.

Use of polarization preserving fibers may be necessary in order to avoid inadvertent polarization rotation, which could cause the amplitude of the beat or heterodyne signal to become small or disappear.

In all measurements discussed here, with a known fixed wavelength of light, the heterodyne signal phase difference can be related to the distance (optical path length) the light has traveled between the fiber ends. To achieve simple measurements, each cycle of phase delay (called a fringe) can be counted, corresponding to an optical path length change of 1 wavelength. These fringes can be counted digitally providing a way to measure distance. If sub-fringe (sub-wavelength) position resolution is needed, then rather than counting fringes, the phase difference can be measured with sub-fringe precision, by directly measuring the absolute phase difference between the two detectors. In that case, sub-wavelength precision can be achieved in the distance measurement. Achieving distance resolution of 1/1000 of a wavelength or less is possible using this method.

Multiple fibers pointing in different directions can also be used to avoid the limitation imposed by finite numerical aperture of the fibers used. These fibers could be multiplexed (sending light into them by light switches only when needed) or could have light emitted from them continuously.

Calibration of the interferometer system can be accomplished in a number of ways. In one example, a separate calibrated positioning system can be used to accurately scan the signal photodetector laterally and at different ranges while near a single reference photodetector. During the scan, the distance between the two photodetectors can be measured interferometrically using the present methodology. This distance data could then be fitted to triangulation formulas, which can be used to uniquely determine the location of the reference fibers and the 3D position of the signal fiber relative to the reference locations. Once calibrated, the location of the signal fiber can be determined without the calibrated positioning system.

As has been described, the difference in phase between heterodyne signals is used to detect the distance or change in distance between the waveguide endpoints and to eliminate dependence on the optical path differences in the two fiber arm paths. More specifically, the optical interference of the two waves in the photodetectors produce charge carriers in each, and the resulting photocurrents contain heterodyne signals that can be compared to detect the change in distance between the waveguide endpoints. Without intending to be bound by any scientific theory, the photocurrents produced in each detector include a static (dc) and a time varying photocurrent. The photocurrent in each detector can be sinusoidal or sinusoidal-like, having a frequency of about the frequency difference $\Delta f$ between the optical beams in the two arms of the interferometer.

The following describes the optical phase difference $\Delta \varphi$ between the two paths (the optical wave number $k_0 = 2\pi/\lambda_0$). The description uses the terms from FIG. 1. At photodetector A, there will be a sinusoidal photo-current (heterodyne signal) at the difference frequency ($\Delta f$) with a phase as shown by Equation I:

$$\varphi_A = k[(L_4 + L_5 + L_7 + L_2 + L_3) - (L_1 + 2L_2 + L_3)] \quad \text{I}$$

At photodetector B, there will be a sinusoidal photo-current (heterodyne signal) at the difference frequency ($\Delta f$) with a phase as shown by Equation II:

$$\varphi_B = k[(L_4 + 2L_5 + L_6) - (L_1 + L_2 + L_7 + L_5 + L_6)] \quad \text{II}$$

If the phase at each photodetector is measured by, for example, a lock-in amplifier, and the difference $\Delta \varphi$ between the phases is measured, the result is as shown in Equation III:

$$\Delta \varphi = \varphi_A - \varphi_B = k2L_7 \quad \text{III}$$

As can be seen, the difference phase $\Delta \varphi$ is dependent upon the distance $L_7$ between the fiber ends and the optical k-vector k, which depends upon the wavelength of the light used.

One advantage of the presently disclosed technology pertains to the size of the photodetectors and how such size relates to alignment between detectors. As the size of the detector decreases, the acceptance angle with good optical interference increases. Without wishing to be bound by theory, the strength of the optical heterodyne signal is proportional to the square root of the power of each of the two interfering beams incident on each detector. The photocurrent is proportional to the strength of the optical heterodyne power as shown in Equation IV:

$$\text{Optical heterodyne power(at the difference frequency)} = 2\sqrt{P_1 P_2} \quad \text{IV}$$

$$I = \text{heterodyne current} = \text{alpha} * \text{optical heterodyne power} = 2 * \text{alpha}\sqrt{P_1 P_2}$$

where alpha is the responsivity of the detector.

The magnitude of the heterodyne current I is proportional to the optical heterodyne signal, which is proportional to the square root of $P_1$, the power reflected from the end of waveguide 1 and $P_2$, the power of the signal which enters waveguide 1 from the other waveguide. Because the reflected power $P_1$ in waveguide 1 is high, an adequate heterodyne photo-current can be generated even by a low amount of power $P_2$ collected from the divergent beam from the other waveguide.

Because of the small effective size of the waveguide, the acceptance and divergence angle of the waveguide is larger. Therefore, precise alignment of the signal and reference detectors is not as critical to perform measurements. In other words, a coherent light beam (reference beam) emitted from a large waveguide must be aligned to a tighter angular tolerance as compared to a smaller diameter beam for effective interference. For example, photodetectors that use visible light (say, 0.5 um wavelength as an example) that are approximately 1 mm in diameter would require an approximate angular alignment tolerance within $4 \times 10^{-1}$ radians in order to achieve good (efficient) interference in distance measurement.

Photodetectors with an effective size of about 2 microns in size (reference beam widths of about 2 microns), on the other hand, would have an approximate angular tolerance of order 0.1 radians in order to efficiently produce interference. Thus, as the size of the waveguide decreases, the angular acceptance (and emission angle) tolerance increases.

It is noteworthy that once two frequency components of light are combined in a waveguide, they propagate together at the same speed, so that their phase relationship is constant. Therefore it does not matter whether they propagate for a long or short distance. When they finally leave the waveguide and reach a photodetector, the heterodyne signal is the same as that which would have been produced if the detection had been made at or near the entrance of the fiber carrying the two frequency components.

Furthermore, without wishing to be bound by theory, the smaller the diameter of the reference beam from each of the fiber channels, the greater the divergence of the beam can be, thus increasing the divergence angle of the beam and the corresponding lateral range in which the opposite photodetector can be placed to detect interference signals. Hence, choice of optical fiber can be based on the size of the fiber core. Single-mode fibers can have a core with a diameter less than 15 microns or less than 10 microns or approximately 1-2 microns. Single-mode fibers are preferred due to their small core size and the corresponding smaller diameter incidence beam that will increase the diffraction angle of the light emitted and therefore the lateral detection range of the opposite small photodetector. It is also critical that single-mode fibers be used to maintain the phase relationship between the propagating frequency components in the waveguide. The photodetectors in this method do not have to be specialized.

Additionally, because the incident beam can be very small and the divergence angle can be large, three dimensional measurements can be made using two, three or more detectors. The interference signals detected by each of the detectors can be used to measure the distance between each of the detectors relative to the other detectors and triangulate the position of any one of the photodetectors relative to the others in three dimensions.

The small size and weight of the fiber elements and the corresponding broad detection ranges and angles can allow the current technology to be applied in a large variety of devices and applications. One of the advantages of the current technology is that it does not require the sophisticated equipment and time constraints for highly accurate beam alignment required by some other interferometric methods. It also uses relatively inexpensive materials for lower cost production. Hence, the current technology can be useful and desirable in many machines, devices and services. In some examples, an interferometer system can be operatively coupled to a machine, such as metrology equipment, manufacturing equipment, robots, vehicles, machining tools and the like. In one aspect, the current technology can be used in metrology to properly calibrate engineering equipment, measurement equipment, and other equipment. In another aspect, the current technology can be used for metrology in micro-fabrication of semiconductors and other similar devices to ensure proper alignment of wafers or other substrates and components, to evaluate surfaces, and to perform any other suitable micro-fabrication tasks. In one aspect, the multiple fibers can be coupled to robotic arms to accurately position the arms relative to a reference frame to grasp or otherwise engage or avoid an object. The robot arms could be part of a stationary robot or as part of an ambulatory robot. The robot could be used in assembly lines, military applications in drones or other equipment, in home consumer products or services, or for various other products and purposes. The robot could have three or more waveguides to give it three dimensional measurement capability, as previously described. One way to accomplish this would be by using one or more than one waveguides attached to the robotic appendages, or other measurable locations on the robot, each with a detector or set of detectors. Additionally, positional information about the robot or other device can be measured by placing one or more waveguides in locations away from the robot or other device. The distance measurement can also be used to measure angles and other geometric quantities. The current technology can also be used in a variety of other devices, systems, and methods. It can also measure velocity, acceleration, etc.

A number of non-limiting examples of the present interferometer system and associated methods will now be described:

In one example, an interferometry system can include a coherent light source operable to generate a beam of coherent light, separate waveguide pathways optically associated with the coherent light source, a photodetector optically associated with each waveguide pathway, and a transceiving segment optically associated with each waveguide pathway at a location between the coherent light source and the photodetector, each transceiving segment being configured to emit an emitted beam of coherent light and positioned to receive a received portion of an emitted beam of coherent light emitted from a transceiving segment optically associated with a different waveguide pathway, the received portion being combined with coherent light from the waveguide pathway receiving the received portion to form an optical interference signal, wherein each waveguide pathway is configured to direct a separate optical interference signal toward a respective photodetector.

In some examples, the coherent light source can include a plurality of coherent light sources.

In some examples, each of the plurality of light sources is configured to emit a beam of coherent light at a unique wavelength.

In some examples, the coherent light source is operable to emit a beam of coherent light having a wavelength of from 400 nm to 1000 nm.

In some examples, each of the separate waveguide pathways comprises a single mode optical fiber.

In some examples, each of the separate waveguide pathways can include a first waveguide segment and a second waveguide segment.

In some examples, the first waveguide segment is configured to direct the beam of coherent light to the transceiving segment.

In some examples, the second waveguide segment is configured to direct the optical interference signal to the respective photodetector.

In some examples, the photodetector is a photodiode having a p-n junction, a photodiode having a p-i-n junction, or combination thereof.

In some examples, the system further includes an optical modulator positioned to modulate the beam of coherent light directed through one or more of the separate waveguide pathways.

In some examples, the optical modulator includes a member selected from the group consisting of an acousto-optic modulator, an electro-optic modulator, a magneto-optic modulator, a mechano-optic modulator, a phase-shifter, and a combination thereof.

In some examples, the optical modulator includes a plurality of optical modulators optically associated with separate waveguide pathways.

In some examples, the system further includes a beam splitter positioned to split the beam of coherent light into a plurality of component beams, each of which is directed down a separate waveguide pathway.

In some examples, the system further includes a reflective surface positioned to direct a reflected portion of the emitted beam toward the transceiving segment from which the emitted beam is emitted.

In some examples, the reflective surface is a retroreflector.

In some examples, the system further includes a beam splitter positioned to direct a plurality of split emitted beams toward the reflective surface.

In some examples, the beam splitter is a polarizing beam splitter.

In some examples, the system further includes a quarter wave plate positioned to manipulate the split emitted beams.

In some examples, the system further includes a lens positioned to focus the split emitted beams toward the reflective surface.

In some examples, the system further includes a lens positioned proximate to a plurality of transceiving segments to direct the reflected portion into the plurality of transceiving segments.

In some examples, the system further includes a lock-in amplifier operatively coupled to one or more photodetectors.

In some examples, a separate lock-in amplifier is operatively coupled to each photodetector.

In some examples, a method of determining a distance between a plurality of points can include directing a beam of coherent light along separate waveguide pathways toward a photodetector optically associated with each separate waveguide pathway, each waveguide pathway further comprising a transceiving segment optically associated therewith, emitting an emitted beam from transceiving segments in separate waveguide pathways, receiving a received portion of the emitted beam at a transceiving segment optically associated with a different waveguide pathway from which the emitted beam was emitted, and wherein the received portion is combined with coherent light in the waveguide pathway receiving the received portion to form an optical interference signal, delivering separate optical interference signals to respective photodetectors to generate a local photocurrent at each respective photodetector, and relating a difference between the local photocurrents at each photodetector to a distance between the transceiving segments of the separate waveguide pathways.

In some examples, directing includes splitting the beam of coherent light into separate component beams and directing each component beam along separate waveguide pathways.

In some examples, the beam of coherent light includes a plurality of beams of coherent light generated from separate coherent light sources.

In some examples, each of the plurality of beams of coherent light has a unique wavelength.

In some examples, the method further includes modulating the beam of coherent light in at least one of the separate pathways.

In some examples, the method further includes directing the emitted beam toward a reflective surface to form a reflected portion of the emitted beam that is directed toward the same transceiving segment from which it is emitted, a transceiving segment of a separate pathway, or both.

In some examples, the method further includes splitting the emitted beam and directing a split emitted beam toward the reflective surface.

In some examples, the method further includes polarizing the emitted beam to form a polarized split emitted beam.

In some examples, the method further includes focusing the emitted beam toward the reflective surface using a lens.

In some examples, the method further includes directing the reflected potion of the emitted beam toward a plurality of transceiving segments using a lens.

In some examples, each separate waveguide pathway comprises a first waveguide segment and a second waveguide segment.

In some examples, the beam of coherent light is directed to the associated transceiving segment via the first waveguide segment.

In some examples, the second waveguide segment is configured to direct the optical interference signal to the respective photodetector.

In some examples, at least one photodetector is a reference photodetector having a fixed position.

In some examples, the local photocurrent is detected using a lock-in amplifier.

In some examples, the lock-in amplifier includes a separate lock-in amplifier at each photodetector.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. An interferometry system, comprising:
    a coherent light source operable to generate a beam of coherent light;
    separate waveguide pathways optically associated with the coherent light source;
    a photodetector optically associated with each waveguide pathway; and
    a transceiving segment optically associated with each waveguide pathway at a location between the coherent light source and the photodetector, each transceiving segment being configured to emit an emitted beam of coherent light and positioned to receive a received portion of an emitted beam of coherent light emitted from a transceiving segment optically associated with a different waveguide pathway, the received portion being combined with coherent light from the waveguide pathway receiving the received portion to form an optical interference signal,
    wherein each waveguide pathway is configured to direct a separate optical interference signal toward a respective photodetector.

2. The system of claim 1, wherein the coherent light source comprises a plurality of coherent light sources.

3. The system of claim 2, wherein each of the plurality of light sources is configured to emit a beam of coherent light at a unique wavelength.

4. The system of claim 1, wherein the coherent light source is operable to emit a beam of coherent light having a wavelength of from 400 nm to 1000 nm.

5. The system of claim 1, wherein each of the separate waveguide pathways comprises a single mode optical fiber.

6. The system of claim 1, wherein each of the separate waveguide pathways comprises a first waveguide segment and a second waveguide segment.

7. The system of claim 6, wherein the first waveguide segment is configured to direct the beam of coherent light to the transceiving segment.

8. The system of claim 6, wherein the second waveguide segment is configured to direct the optical interference signal to the respective photodetector.

9. The system of claim 1, wherein the photodetector is a photodiode having a p-n junction, a photodiode having a p-i-n junction, or combination thereof.

10. The system of claim 1, further comprising an optical modulator positioned to modulate the beam of coherent light directed through one or more of the separate waveguide pathways.

11. The system of claim 10, wherein the optical modulator comprises a plurality of optical modulators optically associated with separate waveguide pathways.

12. The system of claim 1, further comprising a frequency shifter positioned to shift a frequency of the beam of coherent light directed through one or more of the separate waveguide pathways.

13. The system of claim 1, further comprising a beam splitter positioned to split the beam of coherent light into a plurality of component beams, each of which is directed down a separate waveguide pathway.

14. The system of claim 1, further comprising a reflective surface positioned to direct a reflected portion of the emitted beam toward the transceiving segment from which the emitted beam is emitted.

15. The system of claim 14, wherein the reflective surface is a retroreflector.

16. The system of claim 14, further comprising a beam splitter positioned to direct a plurality of split emitted beams toward the reflective surface.

17. The system of claim 16, wherein the beam splitter is a polarizing beam splitter.

18. The system of claim 17, further comprising a quarter wave plate positioned to manipulate the split emitted beams.

19. The system of claim 16, further comprising a lens positioned to direct the split emitted beams toward the reflective surface.

20. The system of claim 14, further comprising a lens positioned proximate to a plurality of transceiving segments to direct the reflected portion into the plurality of transceiving segments.

21. A method of determining a distance between a plurality of points, comprising:
   directing a beam of coherent light along separate waveguide pathways toward a photodetector optically associated with each separate waveguide pathway, each waveguide pathway further comprising a transceiving segment optically associated therewith;
   emitting an emitted beam from transceiving segments in separate waveguide pathways;
   receiving a received portion of the emitted beam at a transceiving segment optically associated with a different waveguide pathway from which the emitted beam was emitted, and wherein the received portion is combined with coherent light in the waveguide pathway receiving the received portion to form an optical interference signal;
   delivering separate optical interference signals to respective photodetectors to generate a local photocurrent at each respective photodetector; and
   relating a difference between the local photocurrents at each photodetector to a distance between the transceiving segments of the separate waveguide pathways.

22. The method of claim 21, wherein directing comprises splitting the beam of coherent light into separate component beams and directing each component beam along separate waveguide pathways.

23. The method of claim 21, wherein the beam of coherent light comprises a plurality of beams of coherent light generated from separate coherent light sources.

24. The method of claim 23, wherein each of the plurality of beams of coherent light has a unique wavelength.

25. The method of claim 21, further comprising modulating the beam of coherent light in at least one of the separate pathways.

26. The method of claim 21, further comprising directing the emitted beam toward a reflective surface to form a reflected portion of the emitted beam that is directed to toward the same transceiving segment from which it is emitted.

27. The method of claim 26, further comprising splitting the emitted beam and directing a split emitted beam toward the reflective surface.

28. The method of claim 27, further comprising polarizing the emitted beam to form a polarized split emitted beam.

29. The method of claim 26, further comprising focusing the emitted beam toward the reflective surface using a lens.

30. The method of claim 26, directing the reflected potion of the emitted beam toward a plurality of transceiving segments using a lens.

31. The method of claim 21, wherein each separate waveguide pathway comprises a first waveguide segment and a second waveguide segment.

32. The method of claim 31, wherein the beam of coherent light is directed to the associated transceiving segment via the first waveguide segment.

33. The method of claim 32, wherein the second waveguide segment is configured to direct the optical interference signal to the respective photodetector.

34. The method of claim 21, wherein at least one photodetector is a reference photodetector having a fixed position.

35. The method of claim 21, wherein the local photocurrent is detected using a lock-in amplifier.

36. The method of claim 35, wherein the lock-in amplifier comprises a separate lock-in amplifier at each photodetector.

* * * * *